United States Patent
Rekaya Ben-Othman et al.

(10) Patent No.: US 10,164,739 B2
(45) Date of Patent: Dec. 25, 2018

(54) JOINT SPACE-TIME AND FEC CODING IN MULTI-MODE FIBER OPTICAL TRANSMISSION SYSTEMS

(71) Applicant: INSTITUT MINES-TELECOM, Paris (FR)

(72) Inventors: Ghaya Rekaya Ben-Othman, Antony (FR); Yves Jaouen, Paris (FR); El-Mehdi Amhoud, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/626,327

(22) Filed: Jun. 19, 2017

(65) Prior Publication Data

US 2018/0019841 A1    Jan. 18, 2018

(30) Foreign Application Priority Data

Jul. 18, 2016  (EP) .................................. 16305926

(51) Int. Cl.
| | |
|---|---|
| *H04L 1/00* | (2006.01) |
| *H04B 10/2581* | (2013.01) |
| *H04B 10/516* | (2013.01) |
| *H04J 14/04* | (2006.01) |
| *H04L 5/00* | (2006.01) |

(52) U.S. Cl.
CPC ....... *H04L 1/0065* (2013.01); *H04B 10/2581* (2013.01); *H04B 10/516* (2013.01);
(Continued)

(58) Field of Classification Search
CPC .............. H04B 10/2581; H04B 10/516; H04L 1/0065; H04L 1/0054; H04L 5/0003; H04J 14/04
(Continued)

(56) References Cited

U.S. PATENT DOCUMENTS

| | | | |
|---|---|---|---|
| 7,596,323 B1 * | 9/2009 | Price ................. | H04B 10/0775 398/140 |
| 2003/0123877 A1 | 7/2003 | Lo | |

(Continued)

FOREIGN PATENT DOCUMENTS

FR    3025676 A1    3/2016

OTHER PUBLICATIONS

A. Lobato, F. Ferreira, J. Rabe, M.Kuschnerov, B.Spinnler, B.Lankl, Mode Scramblers and Reduced-Search Maximum-Likelihood Detection for Mode-Dependent-Loss-Impaired Transmission, in the Proceedings of the European Conference and Exhibition on Optical Communication, Sep. 2013.

(Continued)

*Primary Examiner* — Dalzid Singh
(74) *Attorney, Agent, or Firm* — Meagher Emanuel Laks Goldberg & Liao, LLP

(57) ABSTRACT

Embodiments of the invention provide an optical transmitter configured to transmit a data sequence over at least two spatial propagation modes through an optical transmission channel in a multi-mode optical fiber transmission system, the transmission system being associated with a predefined value of a mode-dependent loss, wherein the optical transmitter comprises:
- a forward error correcting code encoder (22) configured to encode said data sequence into a codeword vector by applying at least one error correcting code;
- a modulator (23) configured to determine a set of modulated symbols by applying a modulation scheme to said codeword vector; and
- a Space-Time encoder (24) configured to determine a codeword matrix by applying a Space-Time code to said set of modulated symbols.

15 Claims, 5 Drawing Sheets

(52) U.S. Cl.
CPC ............ *H04J 14/04* (2013.01); *H04L 1/0054* (2013.01); *H04L 5/0003* (2013.01)

(58) Field of Classification Search
USPC .......................................................... 398/192
See application file for complete search history.

(56) References Cited

U.S. PATENT DOCUMENTS

| | | | |
|---|---|---|---|
| 2005/0201473 A1* | 9/2005 | Lakkis ............... | H04B 1/71637 375/260 |
| 2013/0028271 A1* | 1/2013 | Limberg ............ | H04N 21/6112 370/479 |
| 2015/0039964 A1* | 2/2015 | Fonseka ............. | H03M 13/253 714/756 |
| 2016/0233979 A1* | 8/2016 | Koike-Akino ..... | H03M 13/1111 |

OTHER PUBLICATIONS

European Search Report for 16305926.4 dated Feb. 1, 2017.
Awwad Elie et al: "Space-Time Coding Schemes for MDL-Impaired Mode-Multiplexed Fiber Transmission.Systems", Journal of Lightwave Technology, IEEE, Service Center, New York, NY, US, vol. 33, No. 24, Dec. 15, 2015 (Dec. 15, 2015), pp. 5084-5094.
E. Awwad; G. Rekaya-Ben Othman; Y. Jaouen; Y.Frignac: "Space-Time Codes for Mode-Multiplexed Optical Fiber Transmission Systems", OSA Advanced Photonics Congress: Signal Processing for Photonic Communications (SPPCOM), San Diego-USA, Jul. 2014 (Jul. 2014), pp. 1-3.

\* cited by examiner

JOINT SPACE-TIME AND FEC CODING IN MULTI-MODE FIBER OPTICAL TRANSMISSION SYSTEMS

TECHNICAL FIELD

The invention generally relates to optical communications and in particular to coding methods and devices for optical fiber-based transmission systems using multi-mode fibers.

BACKGROUND

The use of optical fiber has grown tremendously over the last decades. Optical-fibers are used in numerous applications such as in telecommunications. Telecommunication applications include for example applications in global networks and desktop computers. Such telecommunication applications may involve the transmission of voice, data, or video over distances of less than a meter to thousands of kilometers.

Over the last twenty years, the demand for more network capacity has significantly increased as a result of the development of internet and of the growing traffic generated by an increasing number of internet users. Optical fiber transmissions appear as key technologies to meet such continuous demand for higher transmission data rates in global telecommunication infrastructures. Optical fibers are used as a means to transmit light between two ends in fiber-based communication systems. The light carries data and allows transmission over long distances at higher bandwidths than in wire-based or wireless communication systems.

Optical fibers represent optical waveguides that guide electromagnetic waves in the optical spectrum. The propagation of the waves along an optical fiber depends on several parameters related to the fiber such as its geometry, its mode structure, the distribution of the refractive index, and the material it is made of. Optical fibers typically include a transparent core surrounded by a transparent cladding material with a lower index of refraction. Light carrying data propagates in the fiber, which acts as a waveguide, following a succession of internal reflections.

Optical fibers can be classified into two categories depending on the number of propagation modes (also called "transverse modes", "spatial modes" or "spatial propagation modes") which can be supported by the fiber. These modes define the distribution of the waves while propagating in the fiber.

Optical fibers include single-mode fibers (SMF) and multimode fibers (MMF). Single mode fibers are designed to carry light according to a single mode, termed the "fundamental mode". A single-mode optical fiber cable has a core of a small diameter that allows only the fundamental mode to propagate. As a result, the number of light reflections created as the light passes through the core decreases and leads to low attenuations and fast propagation of the signal. Single mode fibers are typically used for long distances applications.

Multi-mode fibers allow the propagation of many modes in a single-core or multi-core fibers where each core can be single-mode or multi-mode. A multi-mode optical fiber cable has a core of a large diameter that allows the propagation of multiple modes of light. As a result, the number of reflections created as the light passes through the core increases, creating the ability to propagate more data at a given time slot. The various propagation modes form a set of orthogonal channels over which independent data symbols can be multiplexed. Space Division Multiplexing (SDM) techniques and in particular mode division multiplexing (MDM) techniques can be used for this purpose and can enable a multiplication of the capacity of a link by the number of propagating modes.

Multi-mode fibers can offer higher transmission rates than single-mode fibers. However, taking advantage of the presence of multiple modes to multiplex and transmit larger amount of data symbols requires managing several modal detrimental impairments. These impairments are mainly due to imperfections of the optical components (e.g. fibers, amplifiers and multiplexers) and to the crosstalk effects between the various propagation modes. Such imperfections induce non-unitary impairments, i.e. impairments that cause a loss of orthogonality and/or a loss of energy between the different channels over which independent data symbols are multiplexed. Such impairments can significantly reduce the capacity of the optical links and deteriorate the performance of the transmission system, particularly in long distances applications.

In particular, propagating modes through multi-mode fibers are affected by a non-unitary crosstalk known as mode dependent loss (MDL). MDL effects require either optical or digital signal processing solutions to be reduced.

Optical solutions using mode scrambling or strong mode coupling were proposed to reduce the impact of MDL on the capacity of optical fiber links. For example, a technique based on placing mode scramblers between the fiber spans is disclosed in "A. Lobato, F. Ferreira, J. Rabe, M. Kuschnerov, B. Spinnler, B. Lankl, *Mode Scramblers and Reduced-Search Maximum-Likelihood Detection for Mode-Dependent-Loss-Impaired Transmission*, In the Proceedings of the European Conference and Exhibition on Optical Communication, September 2013". This technique enables the reduction of the MDL effect. However, it fails to completely mitigate MDL and requires a high number of scramblers which induces an additional implementation complexity of the transmission system.

In the presence of N spatial modes, the multi-mode fiber-based transmission system can be modeled as a N×N optical Multiple-Input Multiple-Output (MIMO) system. The optical transmitter sends data symbols over the N modes and the optical receiver receives N different replicas of the original symbols over the N different available modes. Based on this observation, digital signal processing solutions using Space-Time codes were recently investigated in "E. Awwad, G. Rekaya-Ben Othman, Y. Jaouën, and Y. Frignac, *Space-Time Codes for Mode-Multiplexed Optical Fiber Transmission Systems*, OSA Advanced Photonics Congress: Signal Processing for Photonic Communications (SPPCom), San Diego-USA, July 2014". The use of existing Space-Time codes such as the Silver code, the Golden code, the TAST (for Threaded Algebraic Space-Time) code, and the Alamouti code for MDL mitigation was analyzed in this article for SDM systems involving 3 and 6 propagation modes. Such analysis highlighted the promising potential of the use of Space-Time codes for MDL mitigation at low implementation costs.

Existing coding solutions use Space-Time codes originally designed for data multiplexing and coding in wireless environments characterized by Rayleigh fading propagation models. Although optical-fiber transmission systems can be represented as MIMO systems, the optical fiber propagation environment differs from the wireless one. Consequently, existing Space-Time codes may not be sufficiently adapted to optical MIMO systems, in particular to SDM systems.

There is accordingly a need for designing digital coding techniques enabling a complete mitigation of MDL effects for SDM systems.

SUMMARY

In order to address these and other problems, there is provided an optical transmitter configured to transmit a data sequence over at least two spatial propagation modes through an optical transmission channel in a multi-mode optical fiber transmission system, the transmission system being associated with a predefined value of a mode-dependent loss, wherein the optical transmitter comprises:
- a forward error correcting code encoder configured to encode the data sequence into a codeword vector by applying at least one error correcting code;
- a modulator configured to determine a set of modulated symbols by applying a modulation scheme to the codeword vector; and
- a Space-Time encoder configured to determine a codeword matrix by applying a Space-Time code to the set of modulated symbols.

The error correcting code may be represented by a set of error correcting code parameters and the Space-Time code may be represented by a set of Space-Time code parameters. The optical transmitter may further comprise a processing unit configured to determine at least one parameter of the set of error correcting code parameters and at least one parameter of the set of Space-Time code parameters depending on the predefined value of mode-dependent loss and/or on a predefined coding gain and/or on the at least two of spatial propagation modes.

In certain embodiments, the set of error correcting code parameters may comprise at least a number of codeword vectors, an error correction coding rate, and an error correction minimum distance value and the set of Space-Time code parameters may comprise at least a number of codeword matrices, a Space-Time coding rate, and a Space-Time code Euclidean distance value.

In one embodiment, the processing unit may be configured to determine at least one parameter of the set of error correcting code parameters and at least one parameter of the set of Space-Time code parameters according to a criterion, the criterion being satisfied if the product between the error correction coding rate, the Space-Time coding rate, the square of the error correction minimum distance value, and the square of the Space-Time code Euclidean distance value is greater than a function of the mode-dependent loss value and/or a signal-to-noise ratio value.

In some embodiments, the optical transmitter is configured to previously select a number of propagation modes from the at least two spatial propagation modes according to a mode selection criterion.

The processing unit may be configured to determine at least one parameter of the set of error correcting code parameters and/or at least one parameter of the set of Space-Time code parameters depending on the selected number of propagation modes.

The processing unit may be configured to determine at least one parameter of the set of error correcting code parameters depending on a set of predefined error correcting codes.

The processing unit may be configured to determine at least one parameter of the set of Space-Time code parameters depending on a set of predefined Space-Time codes.

In certain embodiments, the forward error correcting code encoder may be configured to encode the data sequence by applying a serial concatenation of at least two error correcting codes.

Alternatively, the forward error correcting code encoder may be configured to encode the data sequence by applying a parallel concatenation of at least two error correcting codes.

The optical transmitter may further comprise a multi-carrier modulator associated with each mode from the at least two spatial propagation modes for determining a multi-carrier symbol by applying a multi-carrier modulation scheme, the multi-carrier symbol propagating in the transmission system according to the mode.

There is also provided an optical receiver device for receiving a signal comprising a data sequence transmitted by an optical transmitter, the optical receiver comprising:
- a Space-Time decoder configured to decode the signal over a set of selected propagation modes lower than or equal to the at least two spatial propagation modes, the Space-Time decoder providing an estimate of a set of modulated symbols;
- a demodulator configured to determine an estimate of a codeword vector from the estimate of the set of modulated symbols by applying a demodulation scheme; and
- a Forward Error Correcting code decoder configured to generate an estimate of a data sequence by applying at least one error correcting code decoder to the codeword vector.

The Space-Time decoder may be selected in a group consisting of a maximum likelihood decoder, a Zero-Forcing decoder, a Zero-Forcing Decision Feedback Equalizer, and a Minimum Mean Square Error decoder.

The error correcting code decoder may be a Viterbi algorithm.

There is also provided a method of encoding and transmitting a data sequence over at least two spatial propagation modes through an optical transmission channel in a multi-mode optical fiber transmission system, the optical transmission system being associated with a predefined value of a mode-dependent loss, the method comprising:
- encoding the data sequence into a codeword vector by applying at least one error correcting code;
- determining a set of modulated symbols by applying a modulation scheme to the codeword vector; and
- determining a codeword matrix by applying a Space-Time code to the set of modulated symbols.

Advantageously, the various embodiments provide low-complexity encoding solutions for mitigating mode-dependent loss effects in optical transmission systems using multi-mode fibers.

Advantageously, some embodiments of the invention provide combinations of Forward Error Correction coding and Space-Time coding solutions adapted to a predefined value of the mode-dependent loss affecting modes propagation in a multi-mode optical-fiber transmission system.

Advantageously, in combination with the selection of a set of propagation modes over which independent data symbols are transmitted and/or received, the various embodiments provide a joint Forward Error Correction coding and Space-Time coding solution adapted to the number of selected modes. Such solution enables a complexity reduction and an optimization of the use of the available transmission power.

Further advantages of the present invention will become clear to the skilled person upon examination of the drawings and the detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, illustrate some embodiments of the invention.

DETAILED DESCRIPTION

Figure 1:
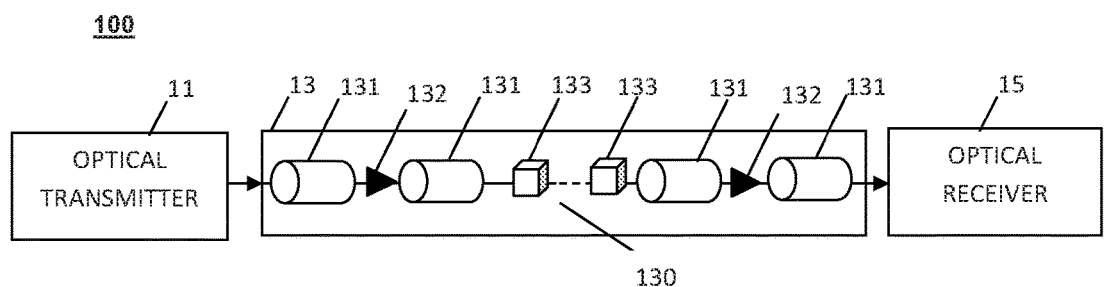
FIG. 1 illustrates a schematic diagram of an exemplary application of the invention in optical communication systems.

Embodiments of the present invention provide an optical transmitter configured to transmit a data sequence over at least two spatial propagation modes through an optical transmission channel in a single-core multi-mode optical fiber transmission system, the transmission system being associated with a predefined value of the mode-dependent loss. The optical transmitter is configured to encode a digital data sequence using a concatenation of at least one forward error correcting (FEC) code and a Space-Time (ST) code. The data sequence comprises a set of symbols to be transmitted through an optical transmission channel in a single-core multi-mode optical fiber transmission system comprising at least two spatial propagation modes. Embodiments of the present invention provide joint FEC coding and Space-Time coding devices and methods enabling a complete mitigation of the mode-dependent loss effects resulting from the crosstalk between the various channels made available by the propagation modes in the multi-mode optical fiber.

Devices, methods and computer program products according to the various embodiments of the invention may be implemented in optical fiber transmission systems applied to a wide variety of applications. Exemplary applications comprise, without limitation, telecommunications, aerospace and avionics, data storage, automotive industry, imaging, and transportation.

Telecommunication applications are widespread and range from desktop computers or terminals to nationwide networks. Such applications may involve transfer of data over distances ranging from less than one meter up to hundreds or thousands of kilometers (e.g. transmission of voice, data, images or video) or connection of networks (e.g. connection for switches or routers in local area networks).

In the aerospace and avionics industries, optical fiber-based products may be used in military and/or commercial applications. Optical fiber technologies and products are designed in such applications to meet rigorous testing and certifications requirements in harsh environments and conditions.

In data storage applications, optical fibers may be used in data storage equipment as a link between multiple devices in a network and/or as part of a storage system. Optical fiber connectivity offers very high bandwidth even over extended distances.

In automotive industry applications, optical fiber technologies may be used for example in lighting, communications, and sensing for safety and control devices and systems.

In imaging applications (e.g. telemedicine), the optical transmission properties of the optical fibers may be used to transmit an image of a target or a subject area to the image view end for analysis and/or interpretation.

In transportation systems, smart highways with intelligent traffic lights, automated tollbooths and changeable message signs use telemetry systems based on optical fibers.

The following description of certain embodiments will be made with reference to telecommunication systems, for illustration purpose only. However, the skilled person will readily understand that the various embodiments of the invention may be applied to other types of systems for different applications.

FIG. 1 illustrates an exemplary application of the invention in a communication system 100 based on optical fiber transmission. The communication system 100 comprises at least one optical transmitter device 11 (hereinafter referred to as a "transmitter") configured to encode an input data sequence into an optical signal and transmit it to at least one optical receiver device 15 (hereinafter referred to as a "receiver") through an optical fiber transmission channel 13.

The optical fiber transmission channel 13 comprises an optical fiber 130 including one or more fiber slices 131. The optical fiber 130 is a cylindrical non-linear waveguide consisting of one core, a cladding and a coating. The optical signal sent by the optical transmitter 11 is confined in the core through total internal reflections due to the difference between the refractive indices of the core and the cladding.

The optical fiber transmission channel 13 may also comprise one or more amplifiers 132 inserted in the fiber. The amplifiers 132 may be inserted between each pair of fiber slices 131 along the optical fiber link to compensate for the fiber attenuation and carry the signal over long distances without the need to regenerate the optical signal. Exemplary optical amplifiers comprise Erbium doped fiber amplifiers (EDFA). Such amplifiers may be implemented in long-haul optical transmissions. They may be inserted every 40 to 120 kilometers to enhance the signal power depending on the type of the fiber, the length of the optical link and the application.

In some embodiments using multi-mode fibers, the amplifiers 132 may be configured to simultaneously amplify the optical signal corresponding to a plurality of propagation modes. Exemplary amplifiers in such embodiments comprise Few Mode Amplifiers such as Few Mode Erbium Doped Fiber Amplifiers.

In some embodiments, the optical signal amplification may be performed in a distributed manner using the non-linear simulated Raman scattering effect. In such embodiments, the fiber may be used as both a transmission link and an amplification medium.

In other embodiments, signal amplification may be achieved by a joint use of regularly arranged optical amplifiers (such as EDFA amplifiers) and of simulated Raman Scattering effects.

In still other embodiments, the signal amplification may be performed in the electrical domain through an optical/electrical conversion (not shown in FIG. 1). In such embodiments, the optical fiber transmission channel 13 may comprise, at each amplification stage:
- a photodiode for converting the optical signal back to the electrical domain;
- an electrical amplifier for amplifying the converted electrical signal; and
- a laser diode for generating an optical signal corresponding to the amplified electrical signal.

The propagation of the optical signal along the optical fiber slices 131 is defined by the number of propagation modes that may depend on several parameters such as the radius of the fiber core, the wavelength of the optical carrier and the difference between the refraction index of the core and the cladding.

In some embodiments, space division multiplexing techniques may be implemented at the optical fiber transmission channel 13, using for example multi-mode fibers supporting a number N≥2 of propagation modes. Large core fibers are examples of multi-mode fibers supporting a large number of propagation modes. Few-mode fibers support a number of propagation modes comprised between two (2) and ten (10). Each propagation mode may be characterized by a different velocity.

In some embodiments using space division multiplexing in multi-mode fibers, the different propagation modes may overlap in a form of an energy transfer between the modes. As a result, the various data symbols carried by each mode may couple along the fiber inducing a crosstalk and an inter-symbol interference. In such embodiments, the optical fiber transmission channel 13 may further comprise a plurality of scrambling components 133 (hereinafter referred to as "scramblers"). The scramblers 133 may be regularly inserted in the channel with a given scrambling period for reducing the crosstalk effect and averaging the losses experienced by the different propagation modes.

According to some embodiments, a scrambler 133 may be associated with each optical amplifier.

Figure 2:
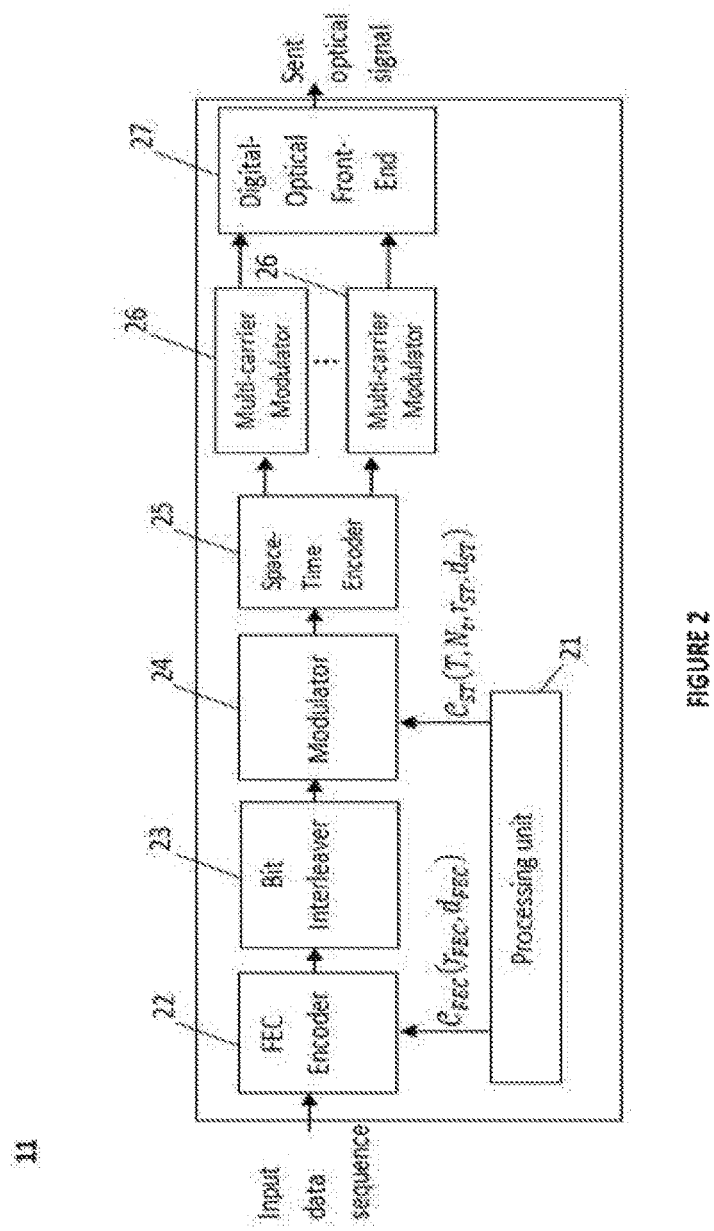
FIG. 2 displays a block diagram illustrating the structure of an optical transmitter according to some embodiments of the invention.

FIG. 2 shows the components of an optical transmitter 11 according to certain embodiments. The optical transmitter 11 may be configured to transform an input data sequence into an optical signal to be transmitted through the optical transmission channel 13. The optical transmitter 11 may comprise:
- a FEC encoder 22 configured to encode an input data sequence of length k (i.e. comprising k symbols) into an encoded sequence in the form of a codeword vector of length n>k by applying at least one Forward Error Correcting code (FEC);
- an interleaver 23 configured to mix the encoded symbols to add a protection layer to the symbols against burst errors before being modulated;
- a modulator 24 configured to modulate the interleaved encoded sequence by applying a modulation scheme such as Quadrature Amplitude Modulation (QAM) and deliver a set of modulated symbols;
- a Space-Time Encoder 25 configured to generate a codeword matrix carrying the data symbols to be sent through the optical transmission channel 13 during a Time Transmission Interval (TTI). The Space-Time encoder 25 may be configured to transform each received sequence (or block) of Q modulated symbols $s_1, s_2, \ldots, s_Q$ into a codeword matrix X of dimensions $N_t \times T$. A codeword matrix comprises complex values arranged in $N_t$ rows and T columns where $N_t$ designates the number of propagation modes used for propagating optical signals and T designates the temporal length of the ST code and corresponds to the number of temporal channel uses. Each value of a codeword matrix accordingly corresponds to a time of use and to a propagation mode used for the signal propagation.

According to some embodiments, the input data sequence may be a binary sequence comprising k bits. The FEC encoder 22 may be configured, in such embodiments, to encode the input binary sequence into a binary codeword vector comprising n bits by applying at least one binary FEC code.

In other embodiments, the input data sequence may comprise symbols that take values in a Galois Field GF(q) with q>2 representing the order of the Galois Field. In such embodiments, the FEC encoder 22 may be configured to encode the input data sequence into a codeword vector comprising n symbols, each symbol comprised in the codeword vector taking value in the Galois Field GF(q). The encoding process in this case may be performed using a non-binary FEC code constructed over GF(q) with q>2.

The following description of certain embodiments will be made with reference to a binary input sequence and binary FEC encoding, for illustration purpose only. However, the skilled person will readily understand that the various embodiments of the invention apply to non-binary FEC coding. Binary FEC codes can be seen as codes constructed over the Galois Field GF(q) of order equal to q=2.

A forward error correcting code $\mathcal{C}_{FEC}$ encoding a sequence of k bits into a sequence of n bits has a coding rate equal to $$r_{FEC} = \frac{k}{n} < 1$$

(hereinafter referred to as "forward error correction coding rate").

The encoded sequence or codeword vector denoted by c belongs to a set of codeword vectors known as "alphabet" or "codebook", and denoted by $A_{FEC}$. The codebook $A_{FEC}$ comprises the set of all possible values of the codeword vectors. Card($A_{FEC}$) designates the number of codeword vectors in the alphabet $A_{FEC}$.

To each couple of different codeword vectors in the codebook $A_{FEC}$, a distance denoted by $d_{FEC}$, known as the 'Hamming distance', may be associated. The Hamming distance between two different codewords $c_i \neq c_j$ is defined as:

$$d_{FEC}(c_i, c_j) = \Sigma_{l=0}^{n-1} \text{XOR}(c_i(l), c_j(l)) \quad (1)$$

In equation (1), $c_i(l)$ (respectively $c_j(l)$) designates the $l^{th}$ component of the codeword $c_i$ (respectively $c_j$). The Hamming distance indicates the number of bits in which the codewords $c_i$ and $c_j$ are different.

Using the Hamming distance, the forward error correcting code $\mathcal{C}_{FEC}$ can be represented by a value of the minimum distance denoted by $d_{min,FEC}$ and defined by:

$$d_{min,FEC} = \min_{i \neq j} d_{FEC}(c_i, c_j) \quad (2)$$

A Space-Time code $\mathcal{C}_{ST}$ encoding a sequence of Q modulated symbols into a codeword matrix X of dimensions $N_t \times T$ has a Space-Time coding rate equal to $$r_{ST} = \frac{Q}{T}$$

symbols per channel use (s/c·u). T denotes the temporal dimension of the Space-Time code $\mathcal{C}_{ST}$ and $N_t$ designates the 'space' dimension equal to the number of used spatial propagation modes in the multi-mode fiber. A codeword matrix X can be written in the form:

$$X = \begin{pmatrix} x_{11} & \cdots & x_{1T} \\ \vdots & \cdots & \vdots \\ x_{N_t 1} & \cdots & x_{N_t T} \end{pmatrix} \quad (3)$$

In equation (3), each value $x_{ij}$ of the codeword matrix X corresponds to the $i^{th}$ propagation mode, for $i=1, \ldots, N_t$, and the $j^{th}$ time of use, for $j=1, \ldots, T$. Each codeword matrix X belongs to a set of codeword matrices termed also codebook or alphabet and denoted by $A_{ST}$. The codebook $A_{ST}$ comprises the set of all possible values of the codeword matrices. Card($A_{ST}$) designates the number of codeword matrices in the alphabet $A_{ST}$.

Each pair of different codeword matrices $X_i$ and $X_j$ for $i \neq j$, may be associated with a difference codeword matrix $D_{ij}$ determined by computing the difference between the two codeword matrices $X_i$ and $X_j$ such that $D_{ij} = X_i - X_j$. Furthermore, each difference codeword matrix may be associated with a distance metric equal to the Euclidean norm of the difference codeword matrix and given by:

$$d_{ST}(X_i, X_j) = \|D_{ij}\| = \|X_i - X_j\| \quad (4)$$

Using the Euclidean distance definition, the Space-Time code $\mathcal{C}_{ST}$ can be represented by a value of the minimum Euclidean distance denoted by $d_{min,ST}$ and defined by:

$$d_{min,ST} = \min_{i \neq j} d_{ST}(X_i, X_j) \quad (5)$$

The various embodiments of the invention provide FEC and ST encoding devices and methods for a total and efficient MDL mitigation in SDM systems using single-core multi-mode fibers. Accordingly, the error correcting code $\mathcal{C}_{FEC}$ implemented by the FEC encoder 22 and the Space-Time code $\mathcal{C}_{ST}$ implemented by the Space-Time Encoder 25 may be determined such that a predefined value of the mode-dependent loss affecting the optical transmission channel 13 can be completely mitigated.

The optical transmitter 11 may accordingly comprise a processing unit 21 configured to determine at least one error correcting code and a Space-Time code such that the joint design or concatenation of the codes enables a complete removal of the mode-dependent loss effects.

In some embodiments, the FEC code $\mathcal{C}_{FEC}$ may be represented by a set of parameters (hereinafter referred to as 'error correcting code parameters') comprising at least the set of codeword vectors or codebook $A_{FEC}$, the error correction coding rate $r_{FEC}$, and the minimum distance $d_{min,FEC}$. The FEC code being accordingly denoted by $\mathcal{C}_{FEC}(A_{FEC}, r_{FEC}, d_{min,FEC})$.

Further, the ST code $\mathcal{C}_{ST}$ may be represented by a set of parameters (hereinafter referred to as 'Space-Time code parameters') comprising at least the set of codeword matrices or codebook $A_{ST}$, the Space-Time coding rate $r_{ST}$, and the minimum Euclidean distance $d_{min,ST}$. The ST code being accordingly denoted by $\mathcal{C}_{FEC}(A_{ST}, r_{ST}, d_{min,ST})$.

In such embodiments, the processing unit 21 may be configured to determine at least one parameter of at least one error correcting code $\mathcal{C}_{FEC}$ and at least one parameter of a Space-Time code $\mathcal{C}_{ST}$ according to the mitigation of a predefined value of the mode dependent loss, denote by MDL.

According to some embodiments, the processing unit 21 may be configured to determine the values of the components of the codeword vectors representing the FEC code and/or the values of the components of the codeword matrices representing the Space-Time $\mathcal{C}_{ST}$ according to a criterion related to the predefined value of the mode dependent loss. In other words, the processing unit 21 may be configured to determine the values of the components $c_i(l)$, $l=1, \ldots, n$ of the codewords $c_i$ for $i=1, \ldots$ Card($A_{FEC}$) and/or the components $x_{ij}$ for $i=1, \ldots, N_t$; $j=1, \ldots, T$ for each codeword matrix X in the codebook $A_{ST}$ depending on a criterion that depends on a predefined value of the MDL.

According to a particular embodiment, the processing unit 21 may be configured to determine at least one parameter of at least one error correcting code and at least one parameter of a Space-Time code according to a criterion being satisfied if the product between the error correction coding rate $r_{FEC}$, the Space-Time coding rate $r_{ST}$, the square of the error correction minimum distance value $d_{min,FEC}^2$, and the square of the Space-Time code minimum Euclidean distance $d_{min,ST}^2$ is greater than a function of the mode dependent loss value such that:

$$r_{ST} \times d_{min,ST}^2 \times r_{FEC} \times d_{min,FEC}^2 > f(MDL) \quad (6)$$

In equation (6), the function $f(\bullet)$ designates any function of the mode-dependent loss value.

According to some embodiments, the function $f(\bullet)$ may be a multiplicative function defined by a slope coefficient denoted by a. The slope coefficient is a real number.

In some embodiments, the processing unit 21 may be further configured to determine at least one parameter of at least one FEC code and/or at least one parameter of a Space-Time code depending on the signal-to-noise ratio. In such embodiments, the slope coefficient of the function $f(\bullet)$ may depend on the signal-to-noise ratio.

According to some embodiments, the processing unit 21 may be configured to determine at least one parameter of at least one error correcting code depending on a predefined group of error correcting codes.

According to one embodiment, the predefined group of error correcting codes may comprise binary error correcting codes.

According to another embodiment, the predefined group of error correcting codes may comprise non-binary error correcting codes.

In a particular embodiment, the predefined group of error correcting codes may comprise the Hamming codes, the Reed-Solomon codes, the convolutional codes, the BCH codes, the Turbo codes, binary Low-Density Parity Check (LDPC) codes, and non-binary LDPC codes.

According to certain embodiments, the processing unit 21 may be configured to determine at least one parameter of a Space-Time code depending on a predefined group of Space-Time codes.

In a particular embodiment, the predefined group of Space-Time codes may comprise orthogonal codes, quasi-orthogonal codes, the Perfect codes, and the TAST code. Exemplary orthogonal codes comprise the Alamouti code.

Further, according to certain embodiments, the processing unit 21 may be configured to determine at least one parameter of at least one error correcting code $\mathcal{C}_{FEC}$ and/or at least one parameter of a Space-Time code $\mathcal{C}_{ST}$ depending on a predefined coding gain denoted by $\Delta G$ and/or depending on the number of used spatial propagation modes $N_t$.

According to some embodiments, the optical transmitter 11 may be configured to transmit the optical signal using all available propagation modes. In such embodiments, the number of used propagation modes $N_t$ may be equal to all the propagation modes N.

Generally, the various propagation modes in a space division multiplexing system do not undergo the same losses due for example to imperfections of the waveguide and imperfections of the optical components inserted in the optical transmission link. Such imperfections result in different modal loss disparities. In such cases, a selection of modes may be performed at the transmitter and/or receiver according to a selection criterion such that only a selected set of modes is used to propagate the optical signal along the fiber. Several selection criteria have been disclosed in the patent application No. FR3025676. Exemplary criteria comprise the selection of a set of modes according to the maximization of the capacity of the space division multiplexing system and the optimization of the average received energy.

Accordingly, in embodiments using mode selection at the transmitter, the optical transmitter 11 may be configured to transmit the optical signal using a set of propagation modes previously selected among the available propagation modes. The number of used propagation modes $N_t$ may be in this case strictly lower than the number of available modes, i.e $N_t$<N.

In such embodiments, the processing unit 21 may be configured to $\mathcal{C}$ determine at least one parameter of at least one error correcting code $\mathcal{C}_{FEC}$ and/or at least one parameter of a Space-Time code $\mathcal{C}_{ST}$ depending on the number of selected spatial propagation modes.

The optical transmitter 11 may further comprise a plurality of multi-carrier modulators 26 configured to generate a multi-carrier symbol by implementing a multi-carrier modulation technique within each optical carrier involving a large number of orthogonal sub-carriers. Moreover, multi-carrier modulations may be implemented in the presence of multi-mode fibers to decouple the different modes and provide a better resistance to the inter-symbol interference resulting from the fiber dispersion and crosstalk between the various modes. Exemplary multi-carrier modulation formats comprise Orthogonal Frequency Division Multiplexing (OFDM) and Filter Bank Multi-Carrier (FBMC).

The frequency-domain signal delivered by the multicarrier modulators 26 may be then processed by a digital-optical Front-End 27 configured to convert the received frequency-domain signal to the optical domain. The digital-optical Front-End 27 may perform the conversion using a number of lasers of given wavelengths and a plurality of optical modulators (not shown in FIG. 2) associated with the used polarization states and the different propagation modes. A laser may be configured to generate a laser beam of a same or different wavelength. The different laser beams may be then modulated using the different outputs of the OFDM symbols (or the different values of the codeword matrix in embodiments using single-carrier modulations) by means of the optical modulators and polarized according to the different polarization states of the fiber. Exemplary modulators comprise Mach-Zehnder modulators. A phase and/or amplitude modulation may be used. In addition, the modulation scheme used by the various optical modulators for modulating the different optical signals may be similar or different.

The number of the optical modulators and lasers depends on the number of used polarization states, the number of used propagation modes, and in general on the number of cores in the fiber. The optical signal thus generated may be then injected in the optical fiber to propagate therein according to the different available propagation modes.

The determined at least one forward error correcting code $\mathcal{C}_{FEC}$ is implemented by the FEC encoder 22 for adding redundant bits (in general redundant symbols) to the input binary sequence so that the receiver can detect and/or correct common transmission errors. The use of a FEC code provides an additional protection and immunity against transmission errors and allows significant improvement in performance with respect to uncoded transmission (i.e. transmission of modulated data without FEC encoding).

Additional improvements and reduction on the probability of error may be achieved through the concatenation of two or more FEC codes. Concatenation of codes may follow a serial, a parallel, or a multi-level architecture. The FEC encoder 22 may be accordingly configured to implement two or more FEC codes.

Figure 3:
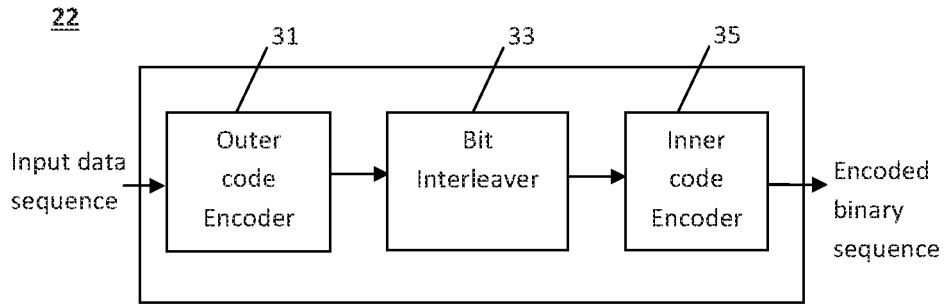
FIG. 3 is a block diagram representing the structure of a Forward Error Correction Encoder according to some embodiments of the invention in which a serial concatenation of two error correcting codes is used.

FIG. 3 is a block diagram of the FEC encoder 22 according to some embodiments in which a serial architecture for concatenating two forward error correcting codes, referred to as an "inner code" and "outer code", is considered. The FEC encoder 22 may accordingly comprise:

an outer code encoder 31 configured to encode a received input sequence into a first binary sequence by applying the outer code;

a bit interleaver 33 configured to arrange the order of the bits in the first encoded binary sequence by the outer code; and an inner code encoder 35 configured to encode the delivered sequence of interleaved bits by the bit interleaver 33 into a second encoded binary sequence to be processed then by the bit interleaver 23 prior to modulation.

Figure 4:
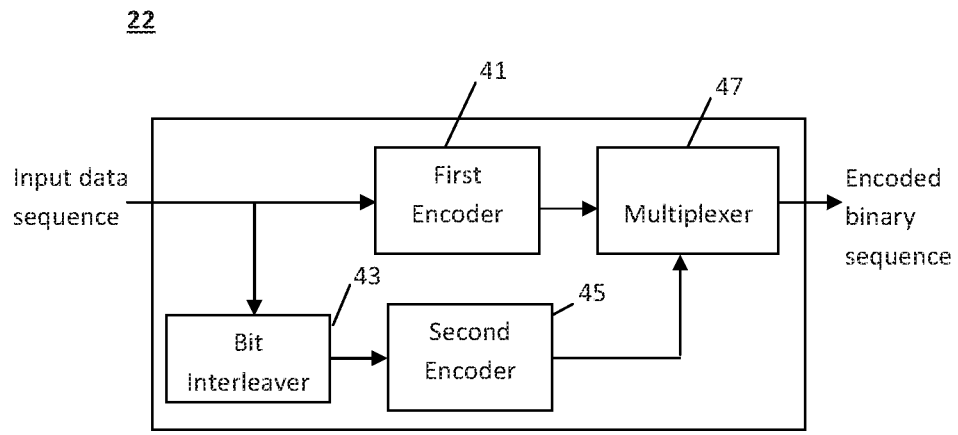
FIG. 4 is a block diagram representing the structure of a Forward Error Correction Encoder according to some embodiments of the invention in which a parallel concatenation of two error correcting codes is used.

FIG. 4 is a block diagram of the FEC encoder 22 according to some embodiments in which a parallel architecture for concatenating two error correcting codes is considered. In such embodiments, the same input binary sequence is encoded by two or more different encoders. However, one of the encoders acts on an interleaved copy of the input sequence. The FEC encoder 22 may accordingly comprise:

a first encoder 41 configured to encode a received input sequence by applying a first forward error correcting code;

a bit interleaver 43 configured to generate an interleaved version of the received input sequence by changing the order of the bits comprised in the input sequence;

a second encoder 45 configured to encode the interleaved version of the input sequence delivered by the bit interleaver 43 by applying a second forward error correcting code; and a multiplexer 47 configured to deliver an encoded binary sequence by multiplexing the outputs of the first encoder 41 and the second encoder 45.

In some embodiments (not shown in FIG. 4), parallel concatenation can be extended to more than two codes by adding additional interleavers and encoders.

In embodiments involving more than one forward error correcting code, the processing unit 21 may be configured to determine at least one code parameter for each concatenated code depending on a predefined value of the mode-dependent loss and/or on a predefined coding gain and/or on a the number of used spatial modes and/or on the signal-to-noise ratio according to any of the preceding features involving a single FEC code.

Figure 5:
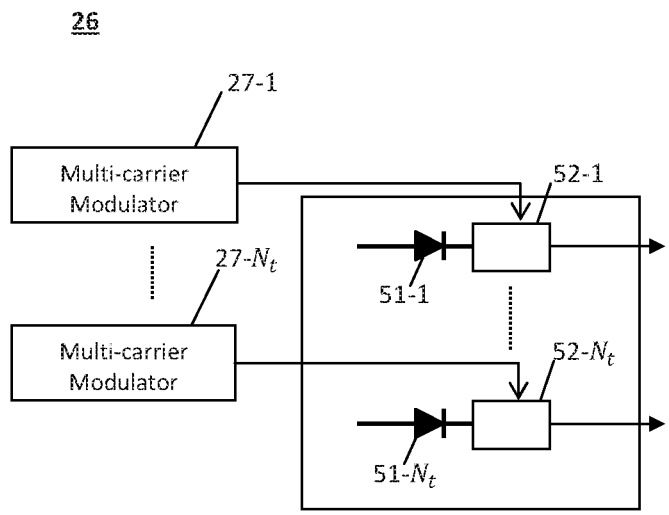
FIG. 5 illustrates a schematic diagram of a digital-optical front-end according to some embodiments using single polarization.

FIG. 5 is a block diagram of the Digital-Optical Front-End 27 according to some embodiments in which a single-core multi-mode fiber and a single polarization state are used. In such embodiments, the number of used propagation modes is lower than or equal to the number N of available propagation modes $N_t \leq N$. The Digital-Optical Front-End 27 may accordingly comprise:

N lasers 51-$n$ for n=1, . . . , $N_t$ of a same wavelength $\lambda_n$. Each laser 51-$n$ is configured to generate a laser beam;

$N_t$ optical modulators 52-$n$ for n=1, . . . , $N_t$ associated with the $N_t$ used propagation modes. Each modulator 52-$n$ may be configured to modulate a laser beam for a time of channel use using a component of the multi-carrier symbol or the codeword matrix in single-carrier embodiments. The modulated beams may be then injected into the multi-mode fiber to propagate each according to a separate mode.

In another embodiment in which wavelength division multiplexing is used, each laser 51-$n$ may use a plurality of wavelengths. The wavelengths may be similar or different. In such embodiment, the plurality $N_t$ of used modes may be combined with a plurality of W wavelengths, each mode being associated with W wavelengths. Accordingly, the Digital Optical Front-End 27 may comprise W lasers of different wavelengths, the beam generated by each laser being modulated by $N_t$ optical modulators (not show in FIG. 5).

In still other embodiments in which polarization division multiplexing is used, the optical signal may be transmitted over the two polarization states of the optical field. In such embodiments (not shown in the figures), the Digital Optical Front-End 27 may comprise $N_t$ lasers, $N_t$ polarization splitters configured to provide two orthogonal polarizations, and $2N_t$ optical modulators. Each pair of modulators may be associated with a laser and may be configured to modulate the signals which are polarized orthogonally. Exemplary polarization splitters comprise for example Wollaston prisms and polarization splitting fiber couplers. In addition, the optical fiber transmission link 13 may further comprise polarization scramblers (not depicted in FIG. 1) configured to compensate the polarization dependent losses.

The optical signal generated according to any of the preceding embodiments may propagate along the fiber until it reaches the other end of the optical transmission system 13 where it is processed by an optical receiver 15.

Figure 6:
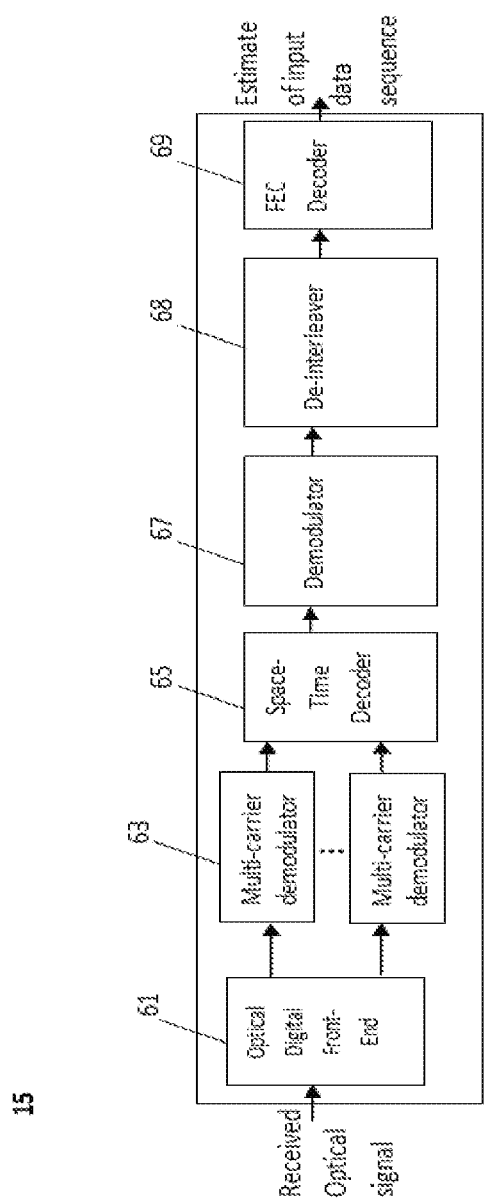
FIG. 6 is a block diagram illustrating the structure of an optical receiver according to some embodiments of the invention.

FIG. 6 is a block diagram of an optical receiver 15 according to some embodiments. The optical receiver 15 is configured to receive the optical signal transmitted by the optical transmitter 11 through the transmission channel 13 and to generate an estimate of the original input data sequence. The optical receiver 15 may comprise:

an optical-digital front-end 61 configured to detect the optical signal, using for example one or more photo-diodes, and to convert it into a digital signal;

a plurality of multi-carrier demodulators 63 configured to remove the cyclic prefix and generate a set of decision variables to be delivered to the Space-Time decoder 65;

a Space-Time decoder 65 configured to generate an estimate of the modulated data sequence from the set of decision variables by applying a Space-Time decoding algorithm;

a demodulator 67 configured to generate a binary sequence by performing a demodulation of the modulated data sequence estimated by the Space-Time decoder 65;

a de-interleaver 68 configured to rearrange the order of the bits (in general the symbols) in the binary sequence delivered by the demodulator 67 to restore the original order of the bits; and a FEC decoder 69 configured to deliver an estimate of the input data sequence processed by the optical transmitter device 11 by applying a soft or hard-decision FEC decoder to the reordered binary sequence delivered by the de-interleaver 68. Exemplary soft-decision FEC decoders comprise the Viterbi algorithm.

The Space-Time decoder 65 may implement a Space-Time decoding algorithm chosen in a group consisting of a maximum likelihood decoder, a Zero-Forcing decoder, a Zero-Forcing Decision Feedback Equalizer, and a Minimum Mean Square Error decoder.

Exemplary maximum likelihood decoders comprise the sphere decoder, the Schnorr-Euchner decoder, the stack decoder, the spherical-bound-stack decoder.

In embodiments using single-carrier modulations, the plurality of multi-carrier modulators 26 may be replaced by a single modulator. Similarly, the multi-carrier demodulators 63 may be replaced by a single demodulator.

In some embodiments, the FEC encoder 22 may be configured to implement a concatenation of two or more forward error correcting codes. In such embodiments, a corresponding structure may be implemented by the FEC decoder 69. For example, in embodiments based on a serial concatenation of an inner code and an outer code, the FEC decoder 69 may comprise an inner code decoder, a de-interleaver, and an outer code decoder (not shown in FIG. 6). In embodiments involving two codes in a parallel architecture, the FEC decoder 69 may comprise a de-multiplexer, a de-interleaver, and a joint decoder (not shown in FIG. 6).

According to some embodiments in which a mode selection is performed at the transmitter, the optical receiver 15 may be configured either to process only the selected propagation modes by the optical transmitter 11 using a mode selection at the receiver or to process the totality of the available propagation modes over which the optical signals propagate.

Figure 7:
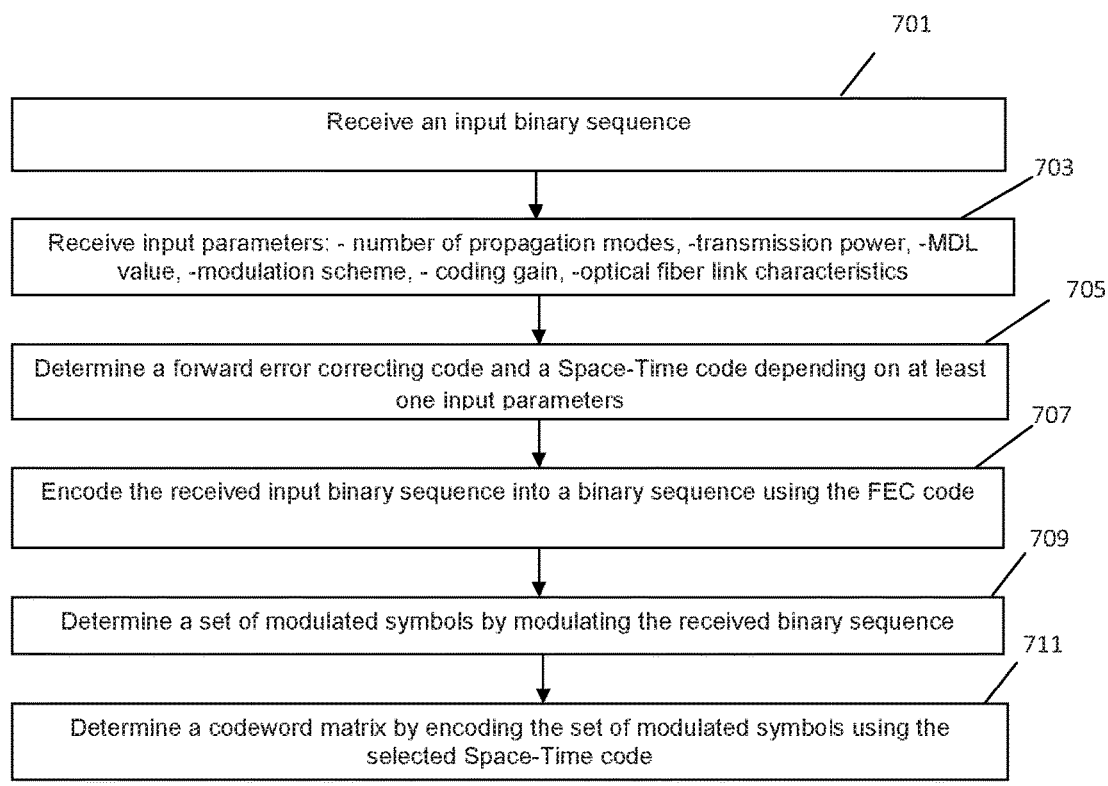
FIG. 7 is a flowchart illustrating a joint Forward Error Correcting coding and Space-Time coding method according to some embodiments of the invention.

FIG. 7 is a flowchart depicting the joint FEC coding and ST coding method according to some embodiments in which the transmission system uses space division multiplexing in a single-core multi-mode fiber, single carrier modulation formats, single wavelength, and a single polarization.

The following description of certain embodiments will be made with reference to binary FEC coding using a single FEC code and assuming a hard-decision decoding at the receiver, for illustration purpose only. However, the skilled person will readily understand that the various embodiments of the invention apply to non-binary coding schemes and to any concatenation of two or more binary or non-binary FEC codes and is not restricted to the use of hard-decision decoding, soft-decision decoding can also be considered.

In step 701, an input binary sequence may be received. The binary sequence may comprise k bits and may be written in a vector notation as:

$$b=(b_1, b_2, \ldots, b_k) \quad (7)$$

In step 703, a set of input parameters may be received or retrieved (for example from some storage means comprised in the optical transmitter device 11). The set of input parameters may comprise:
- the number N of the available propagation modes in the multi-mode fiber;
- the transmission power associated with the optical transmission system 13;
- a predefined value of the mode-dependent loss that may affect the optical transmission channel, denoted by MDL;
- a predefined modulation scheme;
- a predefined coding gain denoted by ΔG; and
- the optical fiber link characteristics comprising at least the length of the optical link and/or the number of scramblers deployed in the optical fiber channel.

The various embodiments of the invention provide encoding methods combining forward error correction coding and Space-Time coding enabling a complete mitigation of the mode-dependent loss effects impacting the optical transmission system.

A binary forward error correcting code of coding rate $$r_{FEC} = \frac{k}{n} < 1$$

encodes the binary sequence $b=(b_1, b_2, \ldots, b_k)$ composed of k bits into a codeword vector c which comprises n bits and can be written in a vector notation as $c=(c_1, c_2, \ldots, c_n)$. For the different values taken by the input binary sequence, the corresponding codeword vectors are different and take values in a set of codeword vectors, the codebook, denoted by $A_{FEC}$. The total number of the different codeword vectors represents the cardinality of the codebook, denoted by $Card(A_{FEC})$.

Any two different codeword vectors in the codebook $A_{FEC}$ may be associated with a distance metric known as the 'Hamming distance', expressed previously in equation (1). The Hamming distance indicates the number of bits in which these codewords are different. Based on the definition of the Hamming distance, the forward error correcting code $C_{FEC}$ may be associated with a second parameter, known as the minimum distance, previously expressed in equation (2). The minimum distance, denoted by $d_{min,FEC}$, represents the minimum value of the Hamming distance metrics over all pairs of different codeword vectors in the codebook $A_{FEC}$.

In the following description of certain embodiments, a FEC code $C_{FEC}$ will be represented by a set of error correction parameters comprising the set of codeword vectors or codebook $A_{FEC}$, the error correction coding rate $r_{FEC}$, and the minimum distance $d_{min,FEC}$. The FEC code will be accordingly denoted by $C_{FEC}(A_{FEC}, r_{FEC}, d_{min,FEC})$.

A Space-Time code $C_{ST}$ of Space-Time coding rate $$r_{FEC} = \frac{Q}{T}$$

encodes a sequence $s=(s_1, s_2, \ldots, s_Q)$ of Q modulated symbols to be sent through the optical transmission channel during T channel uses into a codeword matrix $$X = \begin{pmatrix} x_{11} & \cdots & x_{1T} \\ \vdots & \cdots & \vdots \\ x_{N_t 1} & \cdots & x_{N_t T} \end{pmatrix}$$

composed on $N_t$ row vectors and T column vectors. $N_t$ designates the space dimension of the Space-Time code $C_{ST}$ and T represents the temporal length of the code that may depend on the total transmission time during which the optical transmitter is configured to transmit the optical signal to the optical receiver(s). For the different values taken by the modulated symbols, the corresponding codeword matrices are different and take values in a set of codeword matrices values, the codebook, denoted by $A_{ST}$. The total number of the different codeword matrices represents the cardinality of the codebook, denoted by $Card(A_{ST})$.

Similarly to the FEC code, any two different codeword matrices in the codebook $A_{ST}$ may be associated with a distance metric known as the 'Euclidean distance', expressed previously in equation (4). The Euclidean distance (hereinafter referred to 'Euclidean distance metric') indicates the distance between any two different codewords in the Euclidean Space. Based on the definition of the Euclidean distance, the ST code $C_{ST}$ may be associated with a second parameter, known as the minimum Euclidean distance, previously expressed in equation (5). The minimum Euclidean distance, denoted by $d_{min,ST}$, represents the minimum value of the Euclidean distance metrics over all pairs of different codeword matrices in the codebook $A_{ST}$.

In the following description of certain embodiments, an ST code $C_{ST}$ will be represented by a set of Space-Time code parameters comprising the set of codeword matrices or codebook $A_{ST}$, the Space-Time coding rate $r_{ST}$, and the minimum Euclidean distance $d_{min,ST}$. The ST code will be accordingly denoted by $CST(A_{ST}, r_{ST}, d_{min,ST})$.

Step 705 may be performed to determine at least one parameter of a forward error correcting code $C_{FEC}$ and at least one parameter of a Space-Time code $C_{ST}$ depending on at least one input parameter and according to a criterion related to the predefined value of the mode-dependent loss, MDL, impacting the transmission system.

The optical transmission system may be represented by an optical multiple-input multiple-output system described by the relation:

$$Y = H \cdot X + Z \quad (8)$$

In equation (8):
- X designates a codeword matrix that belongs to the codebook $A_{ST}$,
- Y is a complex-value matrix of dimensions $N_r \times T$ designating the received signal,
- H is a complex-value matrix of dimensions $N_r \times N_t$, designating the optical channel matrix and representing the undergone attenuations during the optical signal propagation over the different propagation modes, and
- Z is a complex-value matrix of dimensions $N_r \times T$, designating the optical channel noise.

According to some embodiments, the channel noise may be modeled by a White Gaussian variable of $2\sigma^2$ variance per complex dimension.

According to some embodiments, the channel matrix may be given by:

$$H=\sqrt{\alpha}\sqrt{D}U \quad (9)$$

In equation (9), D designates a diagonal matrix of diagonal components uniformly selected from the interval $[\lambda_{min}, \lambda_{max}]$ and represent the different losses experienced by the different propagation modes. U denotes a unitary matrix modeling the coupling between the different propagation modes and α characterizes the mode average propagation loss according to the expression:

$$\alpha = \frac{N_t}{\sum_{k=1}^{N_t} \lambda_k} \quad (10)$$

The channel matrix accordingly satisfies $(HH^*)=N_t$, with Tr(A) designating the trace of a given matrix A and the operator $(\bullet)^*$ designating the Hermitian conjugate operation.

The determination of at least one parameter for the FEC code and the ST code based on a criterion related to the mode-dependent loss has been elaborated by the inventors from a decoding error optimization problem which assumes a concatenation of maximum likelihood (ML) Space-Time decoding at the Space-Time decoder 65 and hard-decision FEC decoding at the FEC decoder 69. The determination of the FEC code and the ST code parameters based on such decoding error optimization problem provides an efficient joint FEC code and ST code design enabling the minimization of the decoding error probability with a complete mitigation of the mode-dependent loss affecting the transmission channel.

In the first decoding stage, a Space-Time ML decoding provides an estimate of the transmitted codeword matrix according to the minimization of the Euclidean distance between the received signal Y and the different possible values of the codeword matrices. A ST codeword decoding error occurs if the estimated codeword matrix is different from the transmitted codeword matrix.

The analysis of the codeword error probability under ML ST decoding can be performed based on the pair-wise error probability corresponding to the error probability that for a transmitted codeword, a different codeword matrix is estimated.

In some embodiments assuming that the channel matrix is known at the optical receiver using for example one or more training sequences, the pair-wise error probability denoted by $Pr(X_l \to X_p)$ and corresponding to the error probability of estimating a codeword $X_p$ while a codeword $X_l$ was transmitted is expressed by:

$$Pr(X_l \to X_p) = Q\left(\frac{\|H(X_l - X_p)\|}{2\sigma}\right) \quad (11)$$

In equation (11), $Q(\bullet)$ designates the Q function (not to be confused with the number of modulated symbols) defined by:

$$Q(u) = \frac{1}{2\pi} \int_u^{+\infty} e^{-t^2} dt \quad (12)$$

Using the Chernoff's bound and by averaging over the channel realizations, the pair-wise error probability may be upper bounded according to:

$$Pr(X_l \to X_p) \leq E_H\left[\exp\left(-\frac{\|H(X_l - X_p)\|^2}{8\sigma^2}\right)\right] \quad (13)$$

Each pair of different codeword matrices $X_l$ and $X_p$ for $l \neq p$, may be associated with a difference codeword matrix $D_{lp}$ determined by computing the difference between the different codeword matrices such that $D_{lp}=X_l-X_p$. In addition, each difference codeword matrix may be associated with a distance metric given by $d_{ST}(X_l, X_p)=\|D_{lp}\|=\|X_l-X_p\|$.

Using the difference codeword matrix notation, inequality (13) may be equivalently written as:

$$Pr(X_l \to X_p) \leq E_H\left[\exp\left(-\frac{\|\sqrt{\alpha}\sqrt{D}UD_{lp}\|^2}{8\sigma^2}\right)\right] \quad (14)$$

Using the law of total probability, the pair-wise error probability can be written as:

$$Pr(X_l \to X_p) = p_1 Pr(X_l \to X_p | D_{lp} \text{ unitary}) + p_2 Pr(X_l \to X_p | D_{lp} \text{ non unitary}) \quad (15)$$

In equation (15):
$p_1 = Pr(D_{lp} \text{ unitary})$ designates the probability that the codeword difference matrix $D_{lp}$ is unitary; and
$p_2 = Pr(D_{lp} \text{ non unitary})$ designates the probability that the codeword difference matrix $D_{lp}$ is non-unitary.

The upper bound expression in equation (14) may be accordingly divided into two terms $T_1$ and $T_2$ such that:

$$T_1 = p_1 E_H\left[\exp\left(-\frac{N_t}{\sum_{k=1}^{N_t} \lambda_k} \frac{Tr(DUD_{lp}D_{lp}^*U^*)}{8\sigma^2}\right)\right] \quad (16)$$

And:

$$T_2 = p_2 E_H\left[\exp\left(-\frac{N_t}{\sum_{k=1}^{N_t} \lambda_k} \frac{Tr(DUD_{lp}D_{lp}^*U^*)}{8\sigma^2}\right)\right] \quad (17)$$

The first term $T_1$ comprises the pairs of different codeword matrices associated with unitary difference codeword matrices, while the second term $T_2$ comprises the pairs of different codeword matrices associated with non-unitary difference codeword matrices.

Using the properties of unitary matrices and the minimum Euclidean distance of the code, the first term may be upper bounded according to the expression:

$$T_1 \leq p_{1,min}\exp\left(-\frac{d_{min,ST}^2}{8\sigma^2}\right) \quad (18)$$

In equation (18), $p_{1,min}$ designates the probability that the codeword difference matrix $D_{lp}$ between two codeword matrices $X_l$ and $X_p$ is unitary and is associated with a distance metric equal to the minimum Euclidean distance of the ST code, that is $d_{ST}(X_l,X_p)=\|D_{lp}\|=\|X_l-X_p\|=d_{min,ST}$.

The second term $T_2$ may be simplified as follows. First, using the property that $\Sigma_{k=1}^{N_t}\lambda_k \leq N_t\lambda_{max}$, this term may be upper bounded according to:

$$T_2 \leq p_2 E_{D,U}\left[\exp\left(-\frac{Tr(DUD_{lp}D_{lp}^*U^*)}{8\sigma^2 \lambda_{max}}\right)\right] \quad (19)$$

In equation (19), the upper bound is computed by averaging over the diagonal entries of the matrix D and the components of the unitary matrix U.

Using the property that the product matrix $D_{lp}D^*_{lp}$ is a square Hermitian matrix, there exists a unitary matrix V and a diagonal matrix $\Sigma = \text{diag}(\Sigma_1, \Sigma_2, \ldots, \Sigma_{N_t})$ such that $D_{lp}D^*_{lp} = V\Sigma V^*$. Inequality (19) may be accordingly written as:

$$T_2 \leq p_2 E_{D,U}\left[\exp\left(-\frac{Tr(DUV\sum V^*U^*)}{8\sigma^2 \lambda_{max}}\right)\right] \quad (20)$$

Given that the matrix U is randomly drawn from the unitary matrices ensemble, the product matrix UV follows the same distribution as the matrix U. Then, inequality (20) can be equivalently expressed as:

$$T_2 \leq p_2 E_{D,U}\left[\exp\left(-\frac{Tr(DU\sum U^*)}{8\sigma^2 \lambda_{max}}\right)\right] \quad (21)$$

By developing the product matrix $DU\Sigma U^*$, the upper bound on the pairwise error probability in inequality (21) can be written according to:

$$T_2 \leq p_2 E_{D,U}\left[\exp\left(-\frac{\sum_{k,t=1}^{N_t} \lambda_k \sum_t |U_{kt}|^2}{8\sigma^2 \lambda_{max}}\right)\right] \quad (22)$$

$$\leq p_2 E_{D,U}\left[\prod_{k=1}^{N_t} \exp\left(-\lambda_k \frac{\sum_{t=1}^{N_t} |U_{kt}|^2}{8\sigma^2 \lambda_{max}}\right)\right] \quad (23)$$

$$\leq p_2 \prod_{k=1}^{N_t} E_{D,U}\left[\exp\left(-\lambda_k \frac{\sum_{t=1}^{N_t} |U_{kt}|^2}{8\sigma^2 \lambda_{max}}\right)\right] \quad (24)$$

In inequalities (22)-(24), $U_{kt}$ designates the component of the unitary matrix U at the $k^{th}$ row and $t^{th}$ column. Given the uniform distribution of the experienced losses $\lambda_k$ over the interval $[\lambda_{min}, \lambda_{max}]$, averaging the upper bound in equation (24) over the different values of $\lambda_k$ gives:

$$T_2 \leq p_2 \prod_{k=1}^{N_t} E_U\left[\int_{\lambda_{min}}^{\lambda_{max}} \exp\left(-\lambda_k \frac{\sum_{t=1}^{N_t} |U_{kt}|^2}{8\sigma^2 \lambda_{max}}\right) P(\lambda_k) d\lambda_k\right] \quad (25)$$

In inequality (25), $P(\lambda_k)$ denotes the probability distribution function of $\lambda_k$ and is given by:

$$P(\lambda_k) = \begin{cases} \frac{1}{\lambda_{max} - \lambda_{min}} & \text{if } \lambda_{min} \leq \lambda_k \leq \lambda_{max} \\ 0 & \text{elsewhere} \end{cases} \quad (26)$$

Using the probability distribution function of the experienced losses, inequality (25) can be expressed by:

$$T_2 \leq p_2 \prod_{k=1}^{N_t} E_U\left[\frac{\exp\left(-\frac{\sum_{t=1}^{N_t} E_t |U_{kt}|^2}{8\sigma^2}\right) - \exp\left(-\frac{\lambda_{min}}{\lambda_{max}} \frac{\sum_{t=1}^{N_t} E_t |U_{kt}|^2}{8\sigma^2}\right)}{\frac{(\lambda_{max} - \lambda_{min}) \sum_{t=1}^{N_t} |U_{kt}|^2}{8\sigma^2 \lambda_{max}}}\right] \quad (27)$$

$$\leq p_2 \prod_{k=1}^{N_t} E_U\left[\exp\left(-\frac{1}{2}\left(1 + \frac{\lambda_{min}}{\lambda_{max}}\right) \frac{\sum_{t=1}^{N_t} E_t |U_{kt}|^2}{8\sigma^2}\right) 2\sinh\left(\frac{1}{2}\left(1 - \frac{\lambda_{min}}{\lambda_{max}}\right) \frac{\sum_{t=1}^{N_t} E_t |U_{kt}|^2}{8\sigma^2}\right)\right] \quad (28)$$

Using the approximation of the hyperbolic sine function at high signal-to-noise ratio, the upper bound in inequality (28) can be expressed as:

$$T_2 \leq p_2 \prod_{k=1}^{N_t} E_U\left[\exp\left(-\frac{\lambda_{min}}{\lambda_{max}} \frac{\sum_{t=1}^{N_t} E_t |U_{kt}|^2}{8\sigma^2}\right)\right] \quad (29)$$

$$\leq p_2 E_U\left[\exp\left(-\frac{\lambda_{min}}{\lambda_{max}} \frac{\sum_{k=1}^{N_t}\sum_{t=1}^{N_t} |U_{kt}|^2}{8\sigma^2}\right)\right] \quad (30)$$

$$\leq p_2 E_U\left[\exp\left(-\frac{\lambda_{min}}{\lambda_{max}} \frac{\sum_{t=1}^{N_t} E_t}{8\sigma^2}\right)\right] \quad (31)$$

$$\leq p_2 E_U\left[\exp\left(-\frac{\|D_{lp}\|^2}{8\sigma^2 MDL}\right)\right] \quad (32)$$

In inequality (32), the term MDL corresponds to the value of the mode-depend loss on the optical transmission system given by the ratio between the maximum and the minimum eigenvalues of the channel matrix such that $$MDL = \frac{\lambda_{max}}{\lambda_{min}}.$$

The upper bound in inequality (32) is independent of the unitary matrix U, then the term $T_2$ can be upper bounded according to:

$$T_2 \leq p_2 \exp\left(-\frac{\|D_{lp}\|^2}{8\sigma^2 MDL}\right) \quad (33)$$

Using the properties the minimum Euclidean distance of the ST code, inequality (33) may be equivalently written as:

$$T_2 \leq p_{2,min} \exp\left(-\frac{d_{min,ST}^2}{8\sigma^2 MDL}\right) \quad (34)$$

In equation (34), $p_{2,min}$ designates the probability that the codeword difference matrix $D_{lp}$ between two codeword matrices $X_l$ and $X_p$ is non-unitary and is associated with a distance metric equal to the minimum Euclidean distance of the ST code, that is $d_{ST}(X_l, X_p) = \|D_{lp}\| = \|X_l - X_p\| = d_{min,ST}$.

Combining the results of inequalities (18) and (34), the pair-wise error probability inequality (14) may be written as:

$$Pr(X_l \rightarrow X_p) \leq p_{1,min} \exp\left(-\frac{d_{min,ST}^2}{8\sigma^2}\right) + p_{2,min} \exp\left(-\frac{d_{min,ST}^2}{8\sigma^2 MDL}\right) \quad (35)$$

Finally, the pair-wise error probability can be approximated by:

$$Pr(X_l \rightarrow X_p) \leq p_{2,min} \exp\left(-\frac{d_{min,ST}^2}{8\sigma^2 MDL}\right) \quad (36)$$

In the second decoding stage, Hard-decision FEC decoding provides firm decisions for each component $c_i$ for i= 1, . . . , n of the codeword vector c carried by the received signal to whether the component corresponds to zero (i.e. the bit $c_i$ is equal to '0') or one (i.e. the bit $c_i$ is equal to '1'). A FEC codeword decoding error occurs if at least one bit of the estimated codeword is different from the corresponding bit in the transmitted codeword vector.

The analysis of the codeword error probability under binary FEC decoding can be performed based on the equivalent binary-symmetric channel (BSC) with crossover probability p. The BSC is a transmission channel with binary input and binary output and probability of error p and corresponds to a transmission of binary values equal to zero or to one and a reception of a correct bit with a probability equal to 1−p. Accordingly, the probability of having m errors in a block of n bits comprised in the transmitted codeword vector c maybe expressed as:

$$P_{m,n} = C_n^m p^m (1-p)^{n-m} \quad (37)$$

In equation (37), $C_n^m$ designates the binomial coefficient denoting m combinations among n.

The addition of redundant bits to the original data by FEC coding aims at providing the receiver the capability of detecting and possibly correcting the errors that occurred randomly during the transmission. The correction capability of the code, denoted by t is expressed, as a function of the minimum distance of the code $d_{min,FEC}$ according to:

$$t = \left\lfloor \frac{1}{2}(d_{min,FEC} - 1) \right\rfloor \quad (38)$$

The FEC code decoder can correct up to t transmission errors. When the number of errors exceeds the correction capability of the code, a decoding error may be declared at the receiver. Accordingly, the bit error probability after hard-decision decoding can be upper bounded by:

$$P_e \leq \Sigma_{m=t+1}^n P_{m,n} \quad (39)$$

$$P_e \leq \Sigma_{m=t+1}^n C_n^m p^m (1-p)^{n-m} \quad (40)$$

In the high regime of the signal-to-noise ratio, the crossover probability tends to zero (0). The upper bound on the bit error probability in inequality (40) is consequently dominated by the first term of the summation such that:

$$P_e \leq C_n^{t+1} p^{t+1} \quad (41)$$

Replacing the correction capability term by its expression given in equation (38), inequality (41) may be equivalently written as:

$$P_e \leq C_n^{\bar{d}_{FEC,min}^2} p^{\bar{d}_{FEC,min}^2} \quad (42)$$

In inequality (42), $$\bar{d}_{FEC,min}^2 = \left\lfloor \frac{d_{min,FEC}}{2} \right\rfloor.$$

Combining now the two-stages of the decoding process, and given that a ST codeword error occurs when at least one bit in the transmitted codeword vector c is in error, the decoding decisions at the level of the FEC hard-decision decoding may be expressed based on the pair-wise error probability on the codeword matrices. First, the crossover probability may be written as:

$$p \leq Pr(X_l \rightarrow X_p) \quad (43)$$

And by using the upper bound on the pair-wise error probability in inequality (36), the bit error probability in inequality (42) can be expressed according to:

$$P_e \leq C_n^{\bar{d}_{FEC,min}^2} p_{2,min}^{\bar{d}_{FEC,min}^2} \exp\left(-\frac{d_{min,ST}^2 \bar{d}_{FEC,min}^2}{8\sigma^2 MDL}\right) \quad (44)$$

Using the relation $E_s = E_b \times r_{FEC} \times r_{ST} \times q$ involving the FEC code error correction coding rate $r_{FEC}$, the ST coding rate $r_{ST}$, the average bit energy $E_b$, the average symbol energy $E_s$, and the number of bits per modulated symbol q, the bit error probability can be upper bounded as:

$$P_e \leq C_n^{\bar{d}_{FEC,min}^2} p_{2,min}^{\bar{d}_{FEC,min}^2} \exp\left(-\frac{r_{ST} \times d_{min,ST}^2 \times r_{FEC} \times \bar{d}_{FEC,min}^2}{8\sigma^2 MDL} E_b \times q\right) \quad (45)$$

According to some embodiments, the determination of the parameters of the FEC code $\mathcal{C}_{FEC}(A_{FEC}, r_{FEC}, d_{min,FEC})$ and/or the parameters of the Space-Time code $\mathcal{C}_{ST}(A_{ST}, r_{ST},$ $d_{min,ST}$) may be based on the minimization of the bit error probability in inequality (45) depending on the value of the mode-dependent loss, MDL.

Determining the parameters of the FEC code may be equivalent to:
- determine the values of the components $c_i(l)$, $l=1, \ldots, n$ for each the codeword vector $c_i$ for $i=1, \ldots$ Card $(A_{FEC})$;
- determine the error correction coding rate $$r_{FEC} = \frac{k}{n}.$$

The number of determined components in each codeword vector in the FEC codebook may be considered to determine the FEC coding rate; and
- determine the minimum distance $d_{min,FEC}$ which can be deduced from the different values of the codeword vectors in the alphabet $A_{FEC}$.

Determining the parameters of the ST code may be equivalent to:
- determine the values of the components $x_{ij}$ for $i=1, \ldots, N_t$; $j=1, \ldots, T$ for each codeword matrix X in the codebook $A_{ST}$. Determining the number of components explicitly indicate the temporal length of the Space-Time code. The space dimension depends on the number of spatial propagation modes used or selected among the total number of available modes in the multi-mode fiber.
- determine the Space-Time coding rate $r_{ST}$; and
- determine the minimum Euclidean distance $d_{min,ST}$ which can be deduced from the various codeword matrices in the codebook $A_{ST}$.

According to certain embodiments, at least one parameter of the error correcting code and/or at least one parameter of the Space-Time code may be determined according to a criterion based on the minimization of the bit error probability in inequality (45) for a predefined value of the mode-dependent loss, the criterion being satisfied if the following inequality holds:

$$r_{ST} \times d_{min,ST}^2 \times r_{FEC} \times \overline{d}_{min,FEC}^2 > f(MDL) \quad (46)$$

In inequality (46), $f(\cdot)$ designates any function of the predefined value of the MDL.

According to some embodiments, the function $f(\cdot)$ may be a multiplicative function defined by a slope coefficient denoted by a. The slope coefficient is a real number.

In particular embodiments based on the complete removal of the MDL effect while minimizing the error probability, the function $f(\cdot)$ may be a multiplicative function expressed by:

$$f(MDL) = \frac{8\sigma^2}{E_b \times q} MDL \quad (47)$$

In such embodiments, the slope coefficient is given by $$a = \frac{8\sigma^2}{E_b \times q}$$

and depends on the signal-to-noise ratio.

Further, according to some embodiments, at least one parameter of the error correcting code and/or at least one parameter of the Space-Time code may be determined depending on a predefined coding gain $\Delta G$ that may be received among the input parameters. The coding gain indicates the gain that may be provided by a coded system over an uncoded system (i.e. without FEC coding and without ST coding). It indicates the reduction in signal-to-noise ratio for a coded system to achieve the same error probability as an uncoded system. For deriving the expression of the coding gain, first the bit error probability $P_{e,NC}$ for an uncoded system may be formulated based on inequality (45) such that:

$$P_{e,NC} \leq C_n^1 p_{2,min} \exp\left(-\frac{d_{min,NC}^2}{8\sigma^2 MDL} E_b \times q\right) \quad (48)$$

In inequality (48), $d_{min,NC}$ designates the minimum distance of the modulation used to modulate the encoded vector prior to Space-Time coding and depends on the modulation scheme received among the input parameters.

According to inequalities (45) and (48), the coding gain in the logarithm scale may be given by:

$$\Delta G_{dB} = \left(\frac{r_{ST} \times d_{min,ST}^2 \times r_{FEC} \times \overline{d}_{min,FEC}^2 \times E_b \times q}{d_{min,NC}^2 \times E_b \times q}\right)_{dB} \quad (49)$$

$$= \left(r_{FEC} \times \overline{d}_{min,FEC}^2\right)_{dB} + \left(\frac{r_{ST} \times d_{min,ST}^2}{d_{min,NC}^2}\right)_{dB} \quad (50)$$

$$= G_{dB,FEC} + G_{dB,ST} \quad (51)$$

In equation (51), $G_{dB,FEC}$ and $G_{dB,ST}$ designate respectively the coding gain of an only FEC coded scheme and an only ST coded scheme over an uncoded scheme.

According to some embodiments, at least one parameter of the error correcting code and/or at least one parameter of the Space-Time code may be determined such that a predefined coding gain $\Delta G$ (or its equivalent in the logarithm domain $\Delta G_{dB}$) can be achieved by concatenating the corresponding FEC code and ST code.

Further, according to some embodiments, at least one parameter of the forward error correcting code may be determined depending on a group of error correcting codes comprising binary FEC codes, non-binary FEC codes, Hamming codes, the Reed-Solomon codes, the convolutional codes, the BCH codes, the Turbo codes, binary Low-Density Parity Check (LDPC) codes, and non-binary LDPC codes.

Further, according to some embodiments, at least one parameter of the Space-Time code may be determined depending on a group of Space-Time codes comprising orthogonal codes, quasi-orthogonal codes, the Perfect codes, and the TAST code. Exemplary orthogonal codes comprise the Alamouti code.

At step 707, the received input binary sequence b may be encoded into a codeword vector c selected from the codebook $A_{FEC}$ of the considered FEC code depending on the values of the different bits comprised in the binary sequence.

At step 709, a sequence of Q modulated symbols $s_1$, $s_2, \ldots, s_Q$ may be determined by applying a modulation scheme to the codeword determined in step 707. The symbols may take complex values selected in a set of values depending on the predefined modulation scheme. Different modulation schemes may be implemented such as $2^q$-QAM or $2^q$-PSK with $2^q$ symbols or states. Each modulated symbol comprises q bits (not to be confused with the order of the Galois Field GF(q)). A symbol $s_p$ has an average symbol energy $E_s$ and can be written in the form:

$$s_p = Re(s_p) + i\, Im(s_p) \quad (52)$$

In equation (52), i denotes the complex number such that $i^2 = -1$ and the Re(•) and Im(•) operators output respectively the real and imaginary parts of an input value. When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet $A = [-(q-1), (q-1)]$.

Step 711 may be performed to determine a codeword matrix by encoding the set of modulated symbols using the considered Space-Time code. A codeword matrix may be accordingly selected from the ST codebook depending on the values of the different modulated symbols.

An analysis of the decoding error probability of the concatenation of existing FEC codes and ST codes has been carried out to validate the performance of the joint FEC and ST coding method according to some embodiments. In particular, the error performances of the BCH code $$\left(k = 45,\, n = 63,\, r_{FEC} = \frac{45}{63},\, t = 3\right)$$

and the TAST code ($N_t = 3$, $T = 3$, $r_{ST} = 3$ s/c·u) have been evaluated for different MDL values using 4-QAM modulations. ML ST decoding is performed at the receiver side, in addition to demodulation, de-interleaving and hard-decision FEC decoding.

Figure 8:
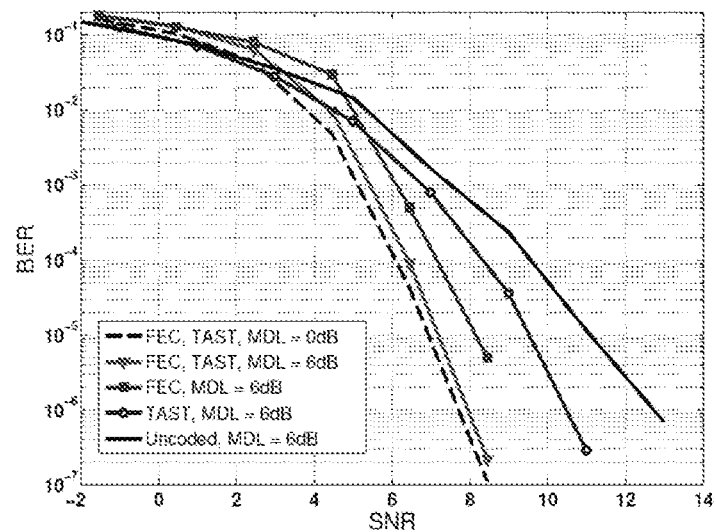
FIG. 8 is a diagram illustrating the Bit Error Rate (BER) performance obtained according to some embodiments of the invention in a 3-mode fiber-based transmission system affected by a mode-dependent loss of 6-decibels, using the TAST code, the BCH code and a combination of BCH and TAST codes.

FIG. 8 depicts the Bit Error Rate (BER) performance as a function of the signal-to-noise ratio (SNR) for uncoded schemes, coded schemes using only a FEC coding based on the BCH code, coded schemes using only a ST coding based on the TAST code, and a joint FEC and ST coding by concatenating a BCH code and the TAST code. Depicted performance results in FIG. 8 are obtained according to some embodiments of the invention in a 3-mode fiber-based transmission system affected by a mode-dependent loss of 6-decibles. ML ST decoding is performed at the receiver side, in addition to demodulation, de-interleaving and hard-decision FEC decoding. Plotted results confirm the efficiency of concatenating a FEC code and a ST code for mitigating the effects of the mode-dependent loss. A joint FEC and ST coded scheme in the presence of a 6-dB MDL approaches the bit error performance of an MDL-free uncoded scheme. In addition, the coding gain reached by the concatenation of the BCH code and the TAST code is approximately equal to the coding gain provided by each code separately, which confirms the results of equation (51).

Figure 9:
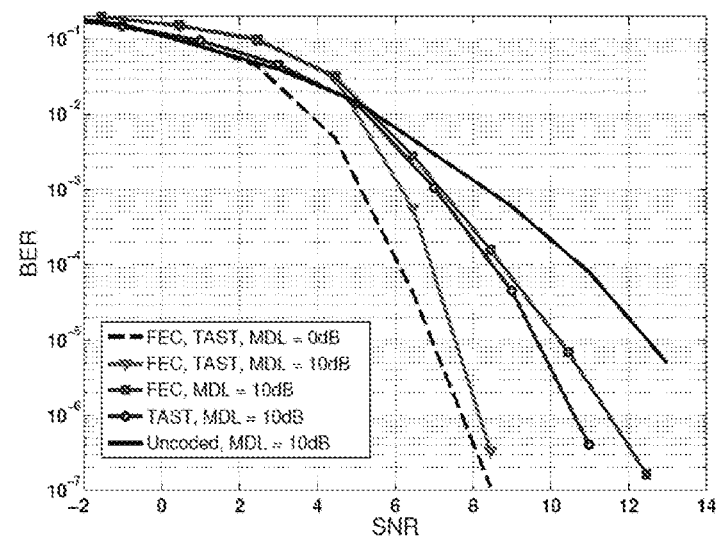
FIG. 9 is a diagram illustrating the Bit Error Rate (BER) performance obtained according to some embodiments of the invention in a 3-mode fiber-based transmission system affected by a mode-dependent loss of 10-decibels, using the TAST code, the BCH (for Bose, Chaudhuri, and Hocquenghem) code and a combination of BCH and TAST codes.

FIG. 9 depicts the Bit Error Rate (BER) performance as function of the signal-to-noise ratio for the same uncoded and coded schemes evaluated in FIG. 8 obtained in a 3-mode fiber-based transmission system affected by a mode-dependent loss of 10-decibles. Similarly to the results of FIG. 8, plotted results in FIG. 9 show the outperformance of a joint FEC and ST coding scheme over the uncoded scheme and over coded schemes using either a FEC code or a ST code alone. Furthermore, results show the capability of such combined coding design in mitigating even high values of mode-dependent losses.

Although the various embodiments have been detailed in the case of single-core multi-mode fibers in which a single polarization, a single wavelength and single-carrier modulation are used, it should be noted that the invention can also be applied in multi-core multi-mode fibers in combination with polarization multiplexing using two polarizations and/or in combination with the use of wavelength multiplexing using several wavelengths, and/or using multi-carrier modulation formats. The application of the invention in such optical-fiber systems may be based on a system model obtained from the generalization of the system provided in this application in equation (8).

Further, the invention is not limited to optical communication devices used in communications and may be integrated in a wide variety of optical devices such as data storage equipment and medical imaging devices. The invention may be used in several optical transmission systems, for example automotive industry applications, in oil or gas markets, in aerospace and avionics sectors, sensing applications, etc.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. An optical transmitter configured to transmit a data sequence over at least two spatial propagation modes through an optical transmission channel in a multi-mode optical fiber transmission system, the transmission system being associated with a predefined value of a mode-dependent loss, wherein the optical transmitter comprises:
   a forward error correcting code encoder configured to encode said data sequence into a codeword vector by applying at least one error correcting code;
   a modulator configured to determine a set of modulated symbols by applying a modulation scheme to said codeword vector; and
   a Space-Time encoder configured to determine a codeword matrix by applying a Space-Time code to said set of modulated symbols.

2. The optical transmitter of claim 1, wherein said error correcting code is represented by a set of error correcting code parameters and said Space-Time code is represented by a set of Space-Time code parameters, the optical transmitter further comprising a processing unit configured to determine at least one parameter of said set of error correcting code parameters and at least one parameter of said set of Space-Time code parameters depending on said predefined value of mode-dependent loss and/or on a predefined coding gain and/or on said at least two of spatial propagation modes.

3. The optical transmitter of claim 2, wherein said set of error correcting code parameters comprises at least a number of codeword vectors, an error correction coding rate, and an error correction minimum distance value and said set of Space-Time code parameters comprises at least a number of codeword matrices, a Space-Time coding rate, and a Space-Time code Euclidean distance value.

4. The optical transmitter of claim 3, wherein said processing unit is configured to determine at least one parameter of said set of error correcting code parameters and at least one parameter of said set of Space-Time code parameters according to a criterion being satisfied if the product between said error correction coding rate, said Space-Time coding rate, the square of said error correction minimum distance value, and the square of said Space-Time code Euclidean distance value is greater than a function of the mode-dependent loss value and/or a signal-to-noise ratio value.

5. The optical transmitter of claim 4, wherein it is configured to previously select a number of propagation modes from said at least two spatial propagation modes according to a mode selection criterion.

6. The optical transmitter of claim 5, wherein said processing unit is configured to determine at least one parameter of said set of error correcting code parameters and/or at least one parameter of said set of Space-Time code parameters depending on said selected number of propagation modes.

7. The optical transmitter of claim 2, wherein said processing unit is configured to determine at least one parameter of said set of error correcting code parameters depending on a set of predefined error correcting codes.

8. The optical transmitter of claim 2, wherein said processing unit is configured to determine at least one parameter of said set of Space-Time code parameters depending on a set of predefined Space-Time codes.

9. The optical transmitter of claim 1, wherein the forward error correcting code encoder is configured to encode said data sequence by applying a serial concatenation of at least two error correcting codes.

10. The optical transmitter of claim 1, wherein the forward error correcting code encoder is configured to encode said data sequence by applying a parallel concatenation of at least two error correcting codes.

11. The optical transmitter of claim 1, wherein it further comprises a multi-carrier modulator associated with each mode from said at least two spatial propagation modes for determining a multi-carrier symbol by applying a multi-carrier modulation scheme, said multi-carrier symbol propagating in the transmission system according to said mode.

12. An optical receiver device for receiving a signal comprising a data sequence transmitted by an optical transmitter according to claim 1, the optical receiver comprising:
 a Space-Time decoder configured to decode said signal over a set of selected propagation modes lower than or equal to said at least two spatial propagation modes, the Space-Time decoder providing an estimate of a set of modulated symbols;
 a demodulator configured to determine an estimate of a codeword vector from said estimate of the set of modulated symbols by applying a demodulation scheme; and
 a Forward Error Correcting code decoder configured to generate an estimate of a data sequence by applying at least one error correcting code decoder to said codeword vector.

13. The optical receiver of claim 12, wherein said Space-Time decoder is selected in a group consisting of a maximum likelihood decoder, a Zero-Forcing decoder, a Zero-Forcing Decision Feedback Equalizer, and a Minimum Mean Square Error decoder.

14. The optical receiver of claim 12, wherein said error correcting code decoder is a Viterbi algorithm.

15. A method of encoding and transmitting a data sequence over at least two spatial propagation modes through an optical transmission channel in a multi-mode optical fiber transmission system, the optical transmission system being associated with a predefined value of a mode-dependent loss, the method comprising:
 encoding said data sequence into a codeword vector by applying at least one error correcting code;
 determining a set of modulated symbols by applying a modulation scheme to said codeword vector; and
 determining a codeword matrix by applying a Space-Time code to said set of modulated symbols.

* * * * *